US006278217B1

(12) United States Patent
Kliman et al.

(10) Patent No.: US 6,278,217 B1
(45) Date of Patent: Aug. 21, 2001

(54) HIGH VOLTAGE GENERATOR STATOR WITH RADIALLY INSERTED CABLE WINDINGS AND ASSEMBLY METHOD

(75) Inventors: Gerald B. Kliman, Niskayuna; Manoj R. Shah, Latham, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/457,480

(22) Filed: Dec. 9, 1999

(51) Int. Cl.[7] ............................... H02K 1/12; H02K 9/00; H02K 1/32; H02K 1/00
(52) U.S. Cl. ............................. 310/254; 310/52; 310/64; 310/65; 310/179; 310/196; 310/216
(58) Field of Search ................................. 310/52, 54, 57, 310/58, 60 A, 64, 65, 179, 196, 216, 254, 258, 259

(56) References Cited

U.S. PATENT DOCUMENTS

| 871,758 | * | 11/1907 | Heitmann et al. | 310/214 |
|---|---|---|---|---|
| 1,375,699 | * | 4/1921 | Ilg | 310/214 |
| 2,711,008 | * | 6/1955 | Smith | 29/155.5 |
| 2,727,161 | * | 12/1955 | Kilner et al. | 310/64 |
| 3,014,139 | | 12/1961 | Shildneck | 310/64 |
| 3,334,252 | * | 8/1967 | Gayral | 310/214 |
| 4,321,497 | | 3/1982 | Long | 310/198 |
| 4,425,521 | * | 1/1984 | Rosenberry, Jr. et al. | 310/214 |
| 4,429,244 | * | 1/1984 | Nikitin et al. | 310/254 |
| 4,584,497 | | 4/1986 | Butman, Jr. et al. | 310/214 |
| 4,900,965 | | 2/1990 | Fisher | 310/216 |
| 6,130,496 | * | 10/2000 | Takigawa et al. | 310/196 |

FOREIGN PATENT DOCUMENTS

WO 97/45923   12/1997   (WO).
WO 97/45934   12/1997   (WO).
WO 97/45939   12/1997   (WO).

OTHER PUBLICATIONS

"The World's First High–Voltage Generator", copied from www.abb.com on Sep. 13, 1999.
Conventional ECM GE Stator (cross–section) represents stator used commercially prior to 1999.
"Outline of Presently Marketed Blower ECM" represents stator used commercially prior to 1999.

* cited by examiner

Primary Examiner—Nestor Ramirez
Assistant Examiner—Dang Dinh Le
(74) Attorney, Agent, or Firm—Nixon & Vanderhye P.C.

(57) ABSTRACT

A stator for a high voltage generator has cable windings that are radially inserted into the stator slots. The stator is assembled as the cable windings are laid into the stator slots. The stator slots are left wide open to allow the cable windings and separator bars to be inserted in the slot as the stator is assembled. The open slots have sidewalls that are defined by stator teeth, which extend radially out from a rotor jig in the stator. As each coil section is laid in a slot, a separator bar is inserted over the coil so that another coil section can be laid into the stator. The coils are stacked in a slot and sandwiched between separator bars also in the slot. The separator bar is keyed to the sidewalls of the teeth to provide structural support for the cable windings.

13 Claims, 4 Drawing Sheets

HIGH VOLTAGE GENERATOR STATOR WITH RADIALLY INSERTED CABLE WINDINGS AND ASSEMBLY METHOD

BACKGROUND OF THE INVENTION

This invention was made with U.S. Government support under contract number 70NANB8H4022 awarded by NIST. The U.S. Government has certain rights in the invention.

The invention relates to high voltage generators and other dynamoelectric machines having stators with cable windings.

High voltage generators produce electric power at transmission line levels, which are generally between 45 kilovolts (kV) to 750 kV. These generators can connect directly to transmission lines. They avoid the need for step-up transformers that are required for generators that produce only lower voltage levels. High voltage generators use windings formed of round conductive cables instead of the winding bars typically used in lower voltage generators. These round cables are able to support the high voltages and carry the currents produced by high voltage generators.

The round cables used as windings in high voltage generators are insulated with a thick sheath formed of a cross-linked polyethylene or similar insulating material. The sheath protects and insulates the conductor core of the cable. In addition, the cables typically have semiconductor layers on the conductor core and on the outer sheath surface of the cable. These semiconductor layers maintain uniform voltage stresses across the core and sheath surface of the cable winding. The cables, especially their insulation and semiconductor layers, are fragile and should be handled carefully as the cables are inserted into the stator during assembly of the generator.

The stators are large cylinders that encircle the rotor of a generator. The rotor is coaxial to the stator, and the stator has a cylindrical aperture to receive the rotor. The stators have radial slots that extend from the rotor aperture outward into the stator. The cable windings are mounted in the stator slots. The slots extend from one end of the stator to the other and along the length of the rotor. The slots form a circular array around the rotor. The cable windings loop back and forth through the slots to form electrical paths surrounding the rotor. In addition, the stator sections between these slots are typically referred to as the teeth of the stator.

This invention was made with

Each turn of the cable must be separately and mechanically supported in the slot. The cable cannot withstand the compressive forces of a stack of cable loops in a stator slot. If the cable is stacked in a slot without supports (such as the support provided by bicycle chain type slot), the cable at the bottom of the slot would suffer a broken or crushed insulation sheath due to electromagnetic forces in the slot.

An example of a stator slot layout is disclosed in commonly assigned U.S. Pat. No. 3,014,139, (the '139 Patent) entitled "Direct-Cooled Cable Winding For Electromagnetic Device". The bicycle chain slots of the stator shown in the '139 Patent support the cable in the stator, transfer heat generated by electrical current out of the cables, and protect the cables from mechanical stresses that might damage the cable. The slot shape of the stator has the cross-section appearance of the outline of a "bicycle chain" and is designed to support each loop of the cable in the stator slot without excessively compressing the insulation sheath of the cable.

During assembly, the cables used as windings in high voltage generators have traditionally been threaded through the stators by inserting the cable into one end of the stator and drawing the cable through to the other end of the stator. As it is threaded through a stator slot, the cable extends out of an end of the stator, is looped back towards that stator end, is inserted into another stator slot, and drawn through that other slot. The threading of the winding cable back and forth through the stator continues as the cable is inserted into the stator slots. When inserted in the slots, the cable forms the windings for the stator of the generator.

A problem exists in threading cable windings through the stator slots. Conventionally, the cables are inserted at one end of a stator and drawn through a stator slot along the entire axial length of the stator until the cable is pulled through the opposite end of the stator. Threading the cable axially through a stator slot tends to place the cable in excessive tension. The insulation sheath of the cables is fragile, and does not tolerate excessive tension or compression forces. Also, the structural and insulating integrity of the cable surface may be compromised or damaged due to the shearing forces between the cable and stator during cable insertion. The cable must be carefully threaded through the slots of the stator to prevent damage to the insulation sheath. The care in threading the cable through the slot increases the complexity of and time required for the cable threading process. Moreover, the cable is susceptible of being damaged, even when the threading process is carefully conducted.

Another difficulty with the conventional threading technique is that a large room is required to thread the cable back and forth through the stator slots. The cable windings are typically stretched out in a long line as it is being threaded into an end of the stator. Similarly, as the cable is pulled through the stator slot, the end of the cable progressively extends further out along a line from the opposite end of the stator. Accordingly, a large amount of space in a stator assembly room has been needed to thread cable through the slots of a stator.

BRIEF SUMMARY OF THE INVENTION

A novel stator has been designed for a generator or other dynamoelectric machine. The stator has cable windings that are radially inserted into slots in the stator. The radial insertion is in contrast to the axial insertion of conventional cable threading techniques. A segment of the cable is laid into the open slot from a radial direction and from the outside diameter of the stator teeth. In the present invention, the cable need not be pushed or pulled through the slot, and there is no need to apply substantial tension on the cable during assembly of the stator. In addition, the present invention requires less floor space to insert the cable windings into the stator because the cables do not have to be extended out from the ends of the stator, as was done previously in threading cables through the stator end-to-end.

In one embodiment of the present invention, the cable windings are laid into the stator slots while the slots are open radially. The stator slots are open to receive the cable windings and separator bars, which are inserted in the slot as the stator is assembled. The open slots have sidewalls that are defined by the stator teeth. These teeth extend radially out from the rotor aperture of the stator. The teeth together form a circular array around the rotor. The coils are inserted in the slots formed between the teeth. As each coil section is laid in a slot a separator bar is inserted over the coil so that another coil section can be laid into the slot. The separator bar is keyed to the sidewalls of the teeth and provides structural support for the cables.

SUMMARY DESCRIPTION OF THE DRAWINGS

DETAILED DESCRIPTION OF THE DRAWINGS

Figure 1:
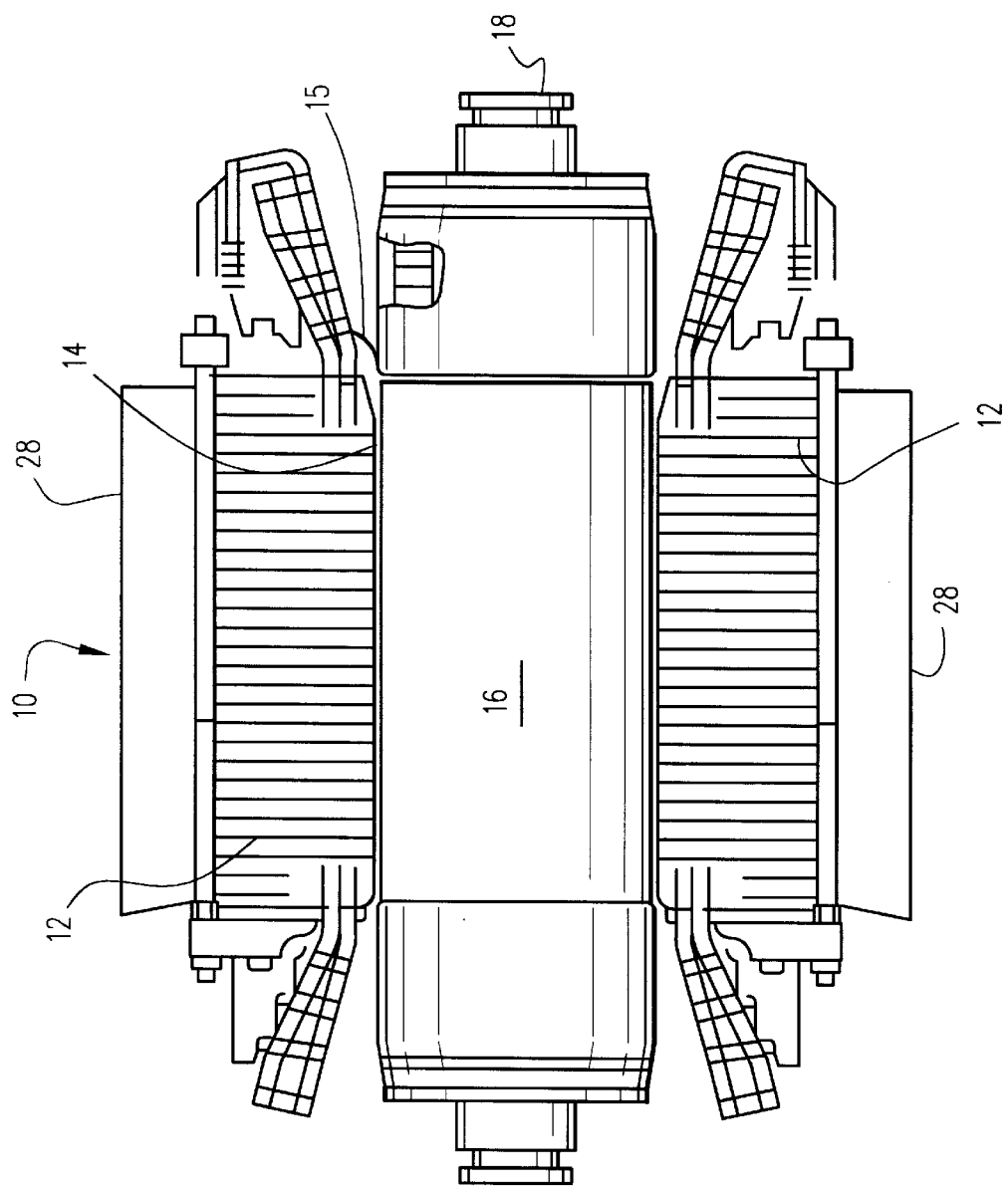
FIG. 1 is a cross-sectional side view of a generator.

FIG. 1 is a general side view of an electric generator 10 including a stationary stator 12 which is an annular body having a cylindrical rotor aperture 14 to receive a rotor 16. The rotor is mounted on shaft 18 which is coupled to a turbine or other power source. The rotor has electromagnetic windings that create a magnetic field surrounding the rotor and extending into the stator. As the rotor spins within the generator, the rotating magnetic field causes electrical voltage to be generated in the cable windings of the stator. The current from the cable windings at a desired voltage level is output from the generator as electrical power.

Figure 2:
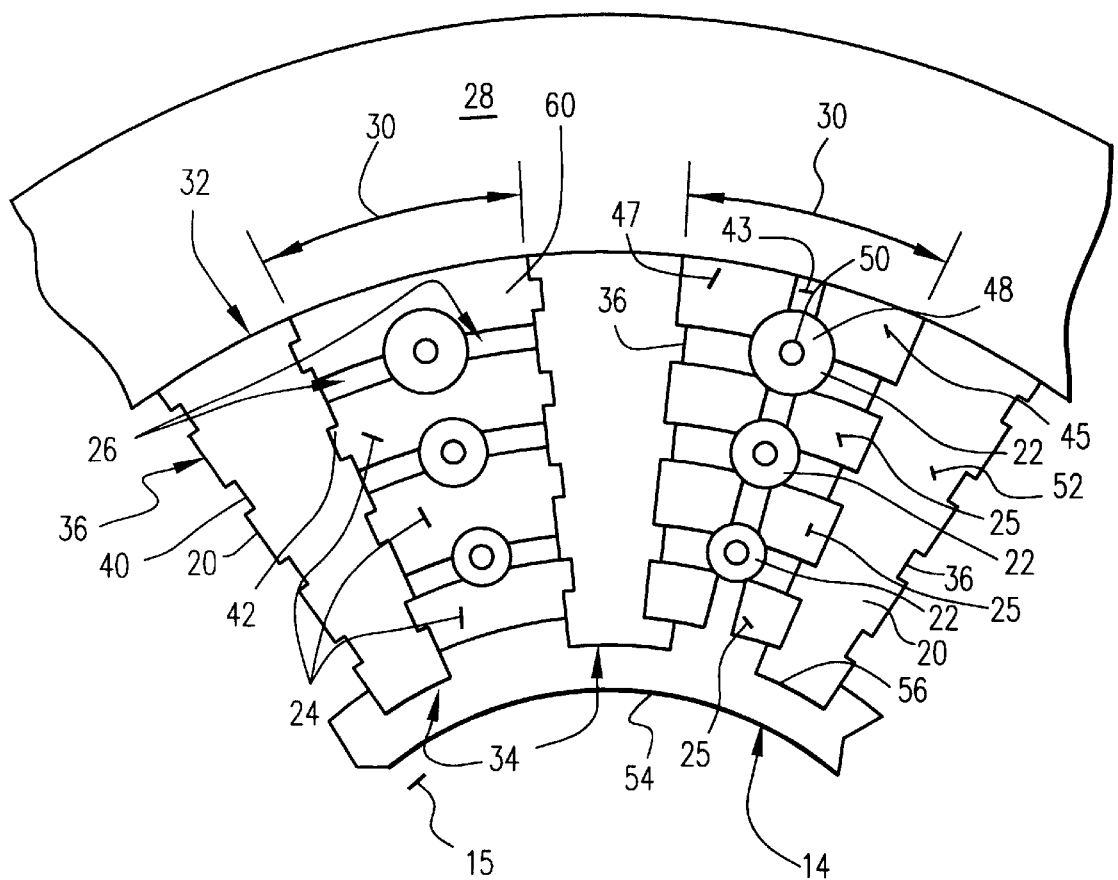
FIG. 2 is a cross-sectional view of a stator section showing two variants of the invention.

FIG. 2 is a cross-section of a segment of a stator and illustrates two possible embodiments of the invention. In particular, the left half of the figure shows a first embodiment of the invention having insulating separator bars 24, and the right half of the figure shows a second embodiment of the invention having magnetic separator bars 25. In an application of the invention, a stator would likely include only one embodiment of the invention, and would not have different embodiments, e.g., different types of separator bars, cables and stator teeth. The particular type and shape of the separator bars, cables and teeth may vary between different applications of the invention and depending on the specific design requirements of each stator.

The stator 10 includes teeth 20 arranged in a circular array about a rotor opening 15. Between the teeth are cable windings 22, separator bars 24, 25 and inter-cable spaces 26 (which may be open coolant conduits). A laminated magnetic yoke 28 surrounds the assembly of stator teeth, cables, separator bars and cable spacers, and provides a casing that holds this stator assembly together. The yoke is an annular casing that slides over the assembly and teeth, cables, separator bars and spacers. The yoke is separate from these other stator components.

The stator teeth 20 form individual partition walls that separate the stator slots 30. The teeth form walls that stand radially outward from stator assembly jig 14. The annular jig may be removed from the rotor opening 15 after assembly of the stator, or retained to provide rigidity to the stator. The teeth may be laminated layers punched from silicon steel sheets as individual rectangular teeth or a group of multiple teeth. The teeth have an inner edge 34 that is adjacent the stator assembly jig 14. The outer edge 32 of the teeth abuts against an inner cylindrical surface of the yoke 28. There may be an interference fit between the yoke and sidewalls to ensure that the teeth and other stator components are held in place by the yoke.

The pair of sidewalls 36 of each tooth 20 forms sidewalls to the adjacent stator slots 30. Adjacent teeth define a stator slot 30 between opposite sidewalls 36 of the teeth. These opposite sidewalls forming a slot provide support for the cable windings 22, separator bars 24, 25 and inter-cable spaces 26 that occupy the slot. The sidewalls 36 are notched to hold the separator bars that support the cable turns. The notches in the sidewalls of the teeth may be key slots 40 that receive key bosses 42 on the stator separator bars 24.

The insulating separator bars 24 shown in the left-hand side of FIG. 2 are formed of an insulating material such as plastic. The bars 25 shown in the right hand side of FIG. 2 are formed of a material, such as a powered metal bound in a plastic matrix. For magnetic powders the separator bars must be split to provide a gap 43 between a right bar segment 45 and a left bar segments 47. The gap 43 separating the magnetic bar segments may be aligned with the center of the cable 22. A similar gap between left and right bars in a stator slot is not needed for bars made of an insulator or a non magnetic composite, as shown in the left hand side of FIG. 2.

The teeth 20 have parallel sides 36 that form tapered slots 30. Widening the slots 30 from the rotor toward the yoke allows the thickness of the cable insulation 48 to be graded according the voltage to ground which, in a normal winding, the voltage to ground (voltage level in cable) would be at its maximum near the bottom of the slot (near the yoke 28).

The cable windings 22, separator bars 24, 25 and cable spacers 26 are held in the stator slots 30. The cable windings 22 are high-voltage cables having a conductive core 50 that is circular in cross-section and formed of wire strands comprising copper, for example. The core may have a semiconductor sheath. In addition, the core and semiconductor sheath is encased in an annular insulation sheath 48, and another semiconductor sheath covering the insulation. The thickness of the insulation sheath may vary along the length of a cable, as is shown in FIG. 2. The insulation sheath may gradually increases in thickness such that the cable windings in the stator slot and near the rotor opening, e.g., inner end, have a insulation sheath that is thinner than the cable windings near an opposite end, e.g. outer end, of the slot.

The separator bars 24, 25 are trapezoidal in cross-section, but may have other cross-sectional shapes that bridge the slot 30 between the teeth and provide support for the cables 22. However, magnetic separator bars 25 may have a gap 43 extending the axial length of the slot 30 in order to separate the left and right segments 45, 47. The separator bars 24, 25 extend the length of the stator slot. The gap 43 may be utilized as a cooling conduit, and may also be incorporated in insulating separator bars. The sides of the separator bars have key bosses 42 that engage key slots 40 in the teeth, as is shown in the right-hand side of FIG. 2. Alternatively, the sides of the separator bars 24 may fit entirely into slots 52 in the sidewalls of the teeth, as is shown in the left-hand side of FIG. 2. The arrangement of key slots and key bosses, and the means by which the separator bars engage the sidewalls of the stator teeth may vary with different applications of this invention.

The separator bars 24, 25 may be proportioned to leave an open space (inter-cable space 26), which is used as a fluid conduit through which a dielectric coolant such as oil may be circulated to cool the surface of the cable. The cross-sectional shape of the separator bars may increase from the bars near the rotor aperture to the yoke to compensate for the increasing width of the slot. If the inter-cable spaces 26 are to be left as open coolant conduits they have no structure themselves. Alternatively, the cable spacers may be structural supports that are sandwiched between an upper and lower separator bars 24 and bracket the cables.

Figure 3:
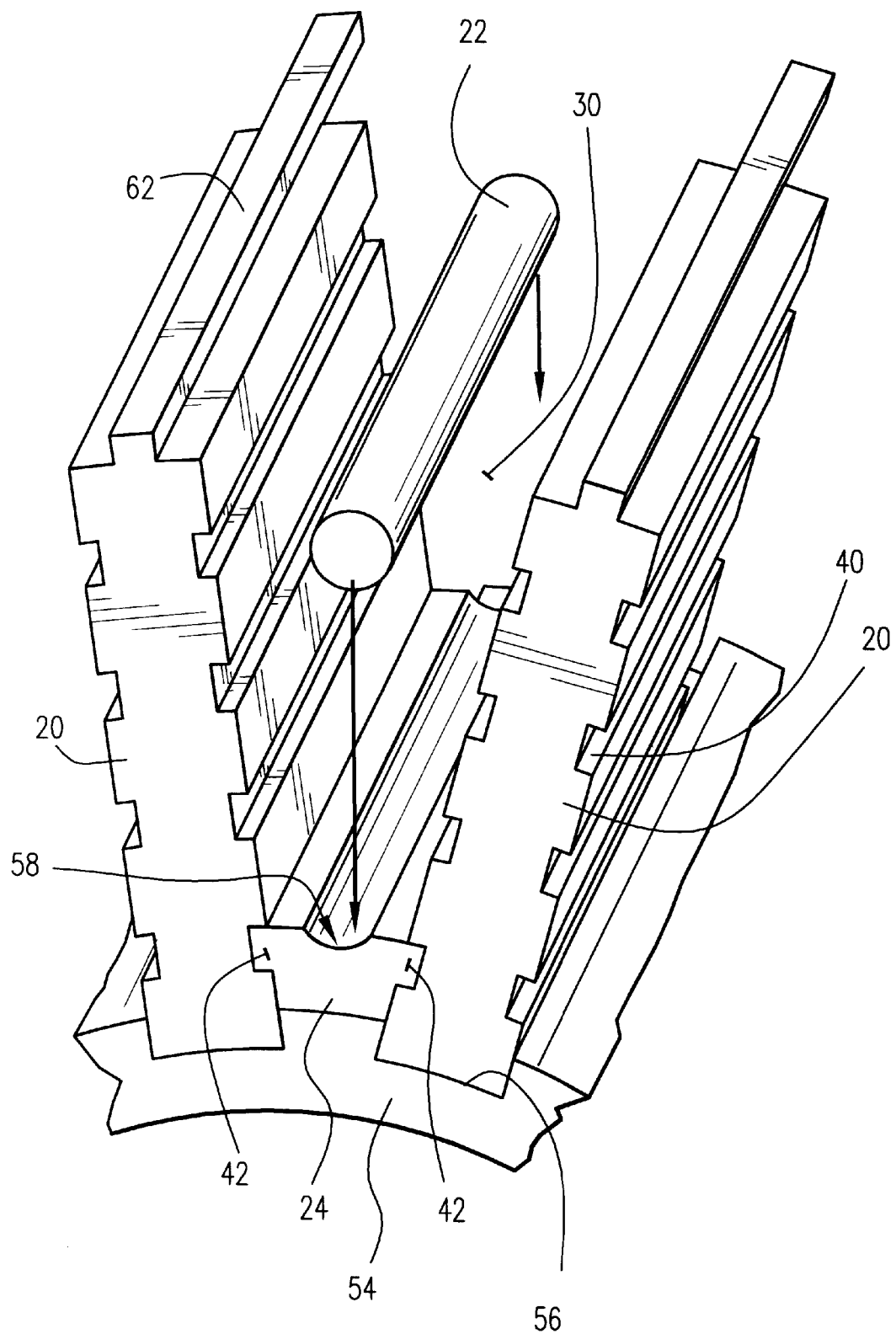
FIG. 3 is an exploded view of the stator components shown in FIG. 2.

As shown in FIG. 3, the channels 58 in the separator bars 24, 25 extend along the length of the bars and the stator. The channel 58 may be a semi-circular groove in an insulating separator bar 24, or a pair of opposite concave shoulders on the left and right segments 45, 47 in a magnetic bar 25. The separator bars may be formed of an insulating plastic, a powered metal (such as a powered molded iron composition) or other material suitable for use in a stator as a support member. Molded iron is finely divided particles of iron (or steel) pressed into final form. Several types of molded iron are commercially available. A common form of molded iron is fine iron powder with an organic binder. Another type of molded iron comprises powdered iron with an inorganic binder and that is annealed has recently become commercially available. A third type of molded iron consists of iron flakes without binder, is also annealed, and is held together by interlocking in the molding process. The separator bars may be multiple pieces, shorter than the length of the stack of laminations forming the stator. Each separator bar may be only a few inches long, especially if the bar is a magnetic composite material. A train of separator bars may be axially inserted into the stator slot to extend the length of the stator and may be interlocked axially.

In one embodiment, during assembly of the stator, the stator teeth are stacked in an annular jig 14 positioned at the rotor opening 15 in the stator. The outer surface of the jig 14 matches the inner cylindrical surface of the stator surrounding the rotor. The jig supports the teeth of the stator during stator assembly. To assemble the stator, the inner edges 34 of the teeth are mounted in grooves 56 on the outer surface of the jig. In this initial assembly arrangement, the teeth extend out in a circular array from the jig. The open stator slots 30 are defined between adjacent pairs of the teeth.

The innermost separator bars 60 (the bar nearest the rotor aperture 14) are inserted axially between a pair of teeth and on the jig. The separator bars are inserted axially into the stator to engage the longitudinal key slots or grooves of the sidewalls of the teeth. If the tooth is formed with overhangs (an inner surface in the tooth to the slot), the first layer of separator bars is unnecessary. The innermost cable segment 62 is inserted radially into the slot (between the inner edges of the teeth 34) and seated in the concave channel 58 of the bar. The separator bars 24 have channels 58 along their upper and lower surfaces to hold the cables 22. The channels are shaped to provide an upper or lower cradle for the cables.

The cable extends out of the axial end of the stator slot and is looped over to another stator slot where the cable is again seated in that other stator slot. The cable is looped from stator slot to slot until the cable-segments are stacked in the stator slots. After a segment of cable 22 is seated in a stator slot 30, a second separator bar 24, 25 is axially inserted into the slot and over the cable segment already seated in the slot. Another segment of the cable is seated over the second separator bar. This procedure of axially inserting separator bars and radially inserted cables and spacers is repeated until the turns of the cable are stacked in the stator slot.

Figure 4:
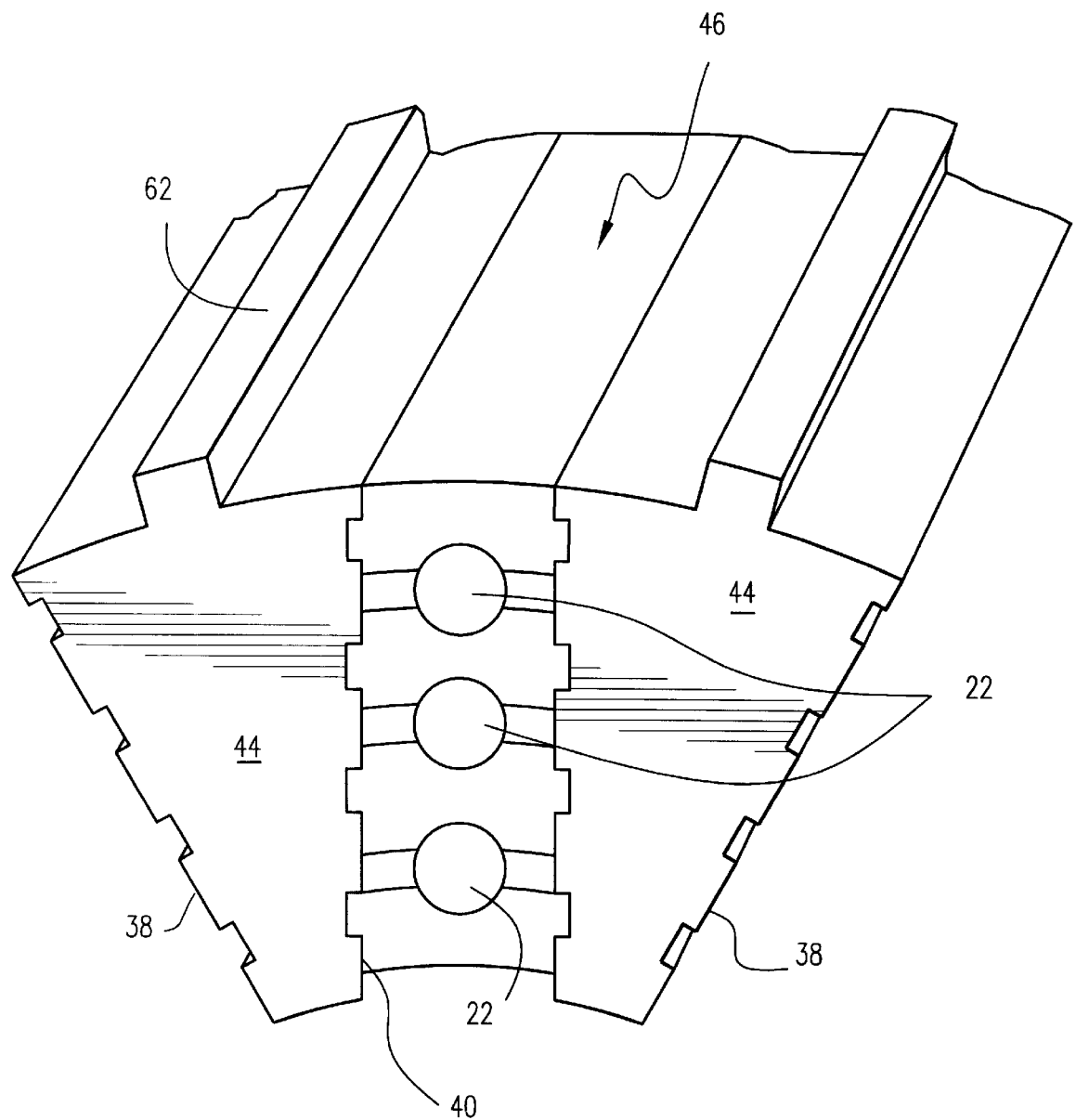
FIG. 4 is a perspective view of a stator tooth with tapered sidewalls and a stator slot with parallel sides.

Alternatively, as is shown in FIG. 4, the sidewalls 42 of the teeth 44 may form a wedge such that the thickness of the stator slot 46 increases from the bottom edge 32 near the rotor to the top edge 34 of the tooth near the yoke 28. Wedged teeth 44 may form stator slots 46 that have parallel sides and a constant width (in contrast to the wedged slots 30 shown in FIG. 2). The cost may be prohibitive, in certain applications, for cables having increasing thickness. Accordingly, it may be more economical for some applications to use a cable having a constant thickness of insulation. In this case all the holes would be the same size, the teeth trapezoidal and the slot approximately rectangular. This configuration may result in reducing the number of different parts needed to form the stator.

Once the cable windings and separator bars are fully stacked in all of the stator slots, the yoke 28 is assembled around the teeth and winding section as shown. The yoke and stator teeth may be formed from oriented silicon steel laminations which provides good magnetic properties in the appropriate and best direction for the magnetic flux being carried through the stator yoke and teeth. The orientation of the silicon steel laminations may be radial in the teeth and azimuthal in the yoke. In addition, keys 60 at the outer edge 32 of the teeth to slide into matching key slots in the yoke can provide good flux transfer and enhanced mechanical integrity. In addition, flanges, bolts and other known mechanical fastening devices may compress the stator slot stacks of cables and bars, the teeth and yoke and to firmly lock them all together.

The invention has been described in context with what is presently considered to be the best mode(s) of the invention. The invention is not limited to the disclosed embodiments. Rather, the invention covers the various modifications and equivalent arrangements included within the spirit and scope of the appended claims.

What is claimed is:

1. A stator for a dynamo electrical machine comprising:
   a circular array of stator sidewalls extending radially outward from a rotor opening, stator teeth with key segments alternating along the radial length of said sidewalls, and stator slots defined between opposite sidewalls;
   separator bars in said stator slots and extending longitudinally along said stator, said separator bars engaged with the opposite sidewalls of the teeth, wherein a plurality of separator bars are stacked in a stator slot, and
   cable windings seated between adjacent separator bars in the stator slots.

2. A stator as in claim 1 further comprising an intra-cable space between said cable and at least one of said opposite sidewalls.

3. A stator as in claim 2 wherein the intra-cable space is a cooling fluid conduit.

4. A stator as in claim 2 wherein said separator bars comprise plastic.

5. A stator as in claim 2 wherein said separator bars comprise a magnetic material, and include a gap extending axially through each bar.

6. A stator as in claim 5 wherein said separator bars comprise a powdered metal.

7. A stator as in claim 1 wherein said separator bars have longitudinal channels on an upper or lower separator bar surface to seat said cable windings.

8. A stator as in claim 1 wherein said separator bars have edges with a key segment that slidably engage opposite key segments in opposite sidewalls of the teeth.

9. A stator as in claim 1 wherein said teeth have upper edges having a top key segment that slidably engage opposite yoke key segments in a yoke.

10. A stator as in claim 1 wherein the cable windings have an insulation sheath that gradually increases in thickness, and the cable windings in the stator slot and near the rotor opening have an insulation sheath that is thinner than that of the cable windings near an opposite end of the slot.

11. A stator as in claim 1 having a yoke slidably mounted on said teeth.

12. A stator as in claim 1 having a yoke formed of azimuthly oriented silicon steel.

13. A stator as in claim 12 wherein said teeth are formed of radially oriented silicon steel.

* * * * *